United States Patent [19]
Li et al.

[11] 3,719,590
[45] March 6, 1973

[54] LIQUID MEMBRANE SYSTEM FOR SEPARATION OF COMPONENTS OF LIQUID MIXTURES

[75] Inventors: Norman H. Li, Edison; Robert P. Cahn, Millburn, both of N.J.

[73] Assignee: Esso Research and Engineering Company, Linden, N.J.

[22] Filed: Dec. 17, 1970

[21] Appl. No.: 99,267

[52] U.S. Cl................208/308, 260/674, 260/677 A, 260/681.5, 210/65, 260/679 A
[51] Int. Cl. .............................................C10g 21/00
[58] Field of Search......................................208/308

[56] References Cited

UNITED STATES PATENTS 1,520,953  12/1924  Johansen..............................208/308
3,389,078  6/1968  Elzinga et al.........................208/308

Primary Examiner—Herbert Levine
Attorney—Chasan & Sinnock and John P. Corcoran

[57] ABSTRACT

This invention relates to a separation process. Specifically, it pertains to the separation of elements of a mixture by selective permeation through a liquid surfactant membrane, which comprises one or more surface active agents, and an additive which selectively increases the solubility of at least one component of the mixture in the liquid membrane, into a solvent phase which may be a solvent for all elements. In a preferred embodiment, hexene-1 is separated from heptane, by use of a liquid surfactant membrane comprising at least 0.2 percent of a Saponin extract as the surface active agent, from 5 percent to 30 percent cuprous ammonium acetate as the solubility increasing additive, and the balance water.

20 Claims, No Drawings

LIQUID MEMBRANE SYSTEM FOR SEPARATION OF COMPONENTS OF LIQUID MIXTURES

BACKGROUND OF THE INVENTION

The separation of mixtures, such as hydrocarbon mixtures in which the components have similar physical and/or chemical properties has long posed a difficult problem to those skilled in the separation art. For example, various hydrocarbon components, while having different structures, may still have identical boiling points and the same number of carbon atoms. Such mixtures are often difficult, if not impossible, to separate by conventional techniques, such as distillation, solvent extraction, selective permeation through solid polymeric membranes or the like. Further, such conventional separation techniques when successful require the use of extensive equipment such as a large number of plates within a distillation process or huge tanks for the required settling step in a conventional liquid solvent separation process.

Prior art processes, therefore, have not proven entirely satisfactory, not only because they were expensive to operate and maintain but often the separations achieved are not as complete as would be desired. In addition, these processes require extensive time periods.

Recently, in U.S. Pat. No. 3,410,794, a liquid membrane process was described which represents a considerable improvement over the prior art, by means of this process hydrocarbons having similar physical and/or chemical properties are readily separated. This separation was accomplished by first coating emulsion-size droplets of the hydrocarbon mixture (average diameter of $10^{-3}$ cm) with an aqueous solution of a water-soluble surfactant to form a liquid membrane around the outer surface of the drops. Following this, the coated drops are contacted with a solvent. The solvent is selected either because of its selectivity toward the more permeable element or elements of the mixture or because of its general compatibility with the mixture. Thus, the use of this solvent serves to encourage the permeation of the more permeable elements through the liquid membrane because of its selectivity or its compatibility in serving as receiving medium for the permeable elements.

Although this process has generally been effective, the time interval required for the diffusion of the more permeable element of the mixture through the liquid surfactant membrane to the solvent, and the selectivity of the separation, is not the optimum from a commercial standpoint. That is, a decrease in diffusion time and an increased selectivity would make the separation of many compounds by liquid surfactant membrane processes economically more attractive.

SUMMARY OF THE INVENTION

According to this invention, it has unexpectedly been discovered that the inclusion within the liquid membrane of an additive, which selectively increases the solubility of one or more components of the mixture to be separated in the liquid surfactant membrane, results in both increased selectivity and increased rate of diffusion through the liquid surfactant membrane. It is desirable that the solubilizing additive does not weaken the liquid surfactant membrane as the liquid surfactant membrane acts to separate the feed from the solvent. Thus, any disruption of the membrane results in mixing of the entire feed mixture with the solvent and, in effect, no separation. The additive thus will be chosen according to two criteria: (1) its ability to selectively solubilize the desired component(s) in the liquid membrane, and (2) its effect on the liquid surfactant membrane strength. If the additive used does decrease the membrane stability, then a membrane-strengthening additive and/or surfactants forming strong membranes should be employed, e.g., Saponin.

The process of this invention is uniquely suited to the separation of various hydrocarbon mixtures which, because of similarity of chemical and/or physical properties, cannot be separated easily by use of conventional methods, i.e., distillation, extraction, etc.

Particular separations within the scope of the instant invention include olefins from paraffins, aromatics from paraffins, diolefins from olefins and paraffins, olefins from naphthenes, aromatics from naphthenes, naphthenes from normal paraffins, tertiary olefins from secondary olefins, mercaptans from hydrocarbons, naphthenic acids from hydrocarbons, acetylenes from more highly saturated hydrocarbons, etc. In aqueous systems, use of cationic exchange resins dissolved in a hydrocarbon membrane permits selective permeation of anions and vice versa.

In each of the above examples, the additives included in the liquid surfactant membrane act to increase the selectivity and rate of diffusion of the desired components into the solvent by increasing the solubility of one or more of the feed components in the liquid surfactant membrane. More specifically, in the separation of olefins from alkanes, $H_2SO_4$, cuprous ammonium acetate, $C_1$ to $C_{10}$ nitriles, $C_1$ to $C_{10}$ sulfones, $1C_1$ to $C_{10}$ amides, e.g., acetonitrile, dimethylformamide, sulfolane, and combinations thereof can be added to the aqueous liquid surfactant membrane to effect the above-enumerated advantages.

In the separation of butadiene from mixtures with butenes and/or butanes, dimethylacetamide, dimethylformamide, cuprous ammonium acetate acetonitrile or N-methyl pyrrolidone may be incorporated in the liquid surfactant membrane to enhance separation.

In a similar manner, sulfolane may be used to separate aromatics from mixtures with paraffins and/or olefins.

Isoprene may be separated from other lower unsaturated $C_5$ hydrocarbons by use of dimethylacetamide, dimethylformamide, acetonitrile or N-methyl pyrrolidone dissolved in the liquid surfactant membrane.

Sodium or potassium hydroxide or carbonate can be incorporated in a liquid surfactant membrane to enhance the separation of acetylenes or mercaptans from other hydrocarbons.

Weak organic acids, e.g., acetic and propionic acid, can be incorporated within the liquid surfactant membrane to enhance the separation of amines from hydrocarbons.

Many other examples will be apparent to the skilled artisan, and are too numerous to be mentioned here.

A wide variety of surfactants can be used with the solubilizing additives of the instant invention. Various surfactants include anionic, cationic, and nonionic surfactants, as well as miscellaneous surfactants such as polymeric and fluorocarbon surfactants.

Anionic surfactants include a wide range of compounds. Perhaps the best known of which are the soaps which are watersoluble salts of long-chain carboxylic acids. The soaps usually contain 12 to 18 carbon atoms per molecule and may be prepared from saturated or unsaturated fatty acids. Generally, the soaps are salts of sodium, potassium or ammonia.

Included among the soaps are the aliphatic sulfonates which are represented by the general formula: $R \cdot SO_2 \cdot O^- Na^+$ in which R can be a straight-chain or branched-chain paraffin, or a cycloaliphatic radical. Exemplary of this group is sodium tetradecane sulfonate. Additionally, the group includes sulfonates of aliphatic-aromatic hydrocarbons such as alkylated naphthalene, alkylated benzene, and aralkyl aromatics.

Other surface active agents included in this general group are ester sulfonates, such as sulfoester and sulfoacyl compounds, amide sulfonates, such as sulfoamide and sulfoacyl amide compounds, and sulfoamide sulfonates. Additionally, sulfonates containing ether, amino, keto and sulfone groups may be utilized.

The anionic surface-active agents also include aliphatic sulfates which are characterized by the general formula $R(OSO_3^- Na^+)_n$ wherein R contains one or more hydrophobic groups and n is at least one. R may be a saturated or unsaturated aliphatic group, branched or with a straight chain usually containing 12 carbon atoms. Exemplary of this group is sodium dodecyl sulfate.

The group also includes sulfated fatty alcohols, such as straight-chain, secondary, tertiary and branched-chain fatty alcohol sulfates. Additionally, sulfated fatty condensation products, sulfated fatty glycerides, acids and esters as well as sulfonated oils may be used.

Also included in the group of anionic surfactants is saponin, a plant glucoside that foams in water forming a colloidal solution.

This surfactant is preferred for use within the scope of the instant invention. Saponin is a type of glycoside widely distributed in plants. It is not a pure compound and a highly surface active fraction may be separated from the naturally occurring product. This fraction is separated by blowing air through a solution of from 0.01 to 1 percent Saponin in water and collecting the foam. This highly surface active fraction is characterized by its ability to cause a surface tension reduction of 10 dynes/cm at a compressed film area between 17 and 34 A$^{o2}$/molecule, molecular weight and of 30 dynes/cm at a compressed film area between 13 and 28 A$^{o2}$/olecule, molecular weight. Surface tension can be measured with high precision by using differential measurements of surface tension in Langmuir's "surface balance." The surface of water in a trough is divided into 2 parts by a barrier not wetted by water. The surfactant film is spread out on the surface only on one side of the barrier. The spread of the surfactant film will tend to push the barrier to the other side. When the barrier is moved against the surfactant film for the purpose of compressing it, the surface tension drop, or surface pressure, can be measured. It is the original surface tension minus the force required to push the barrier against the surfactant film at a certain barrier position divided by the length of the barrier. The area occupied by a single surfactant molecule can also be calculated at a given barrier position —because the total film area can be calculated; this together with the information on how much surfactant used to form the film, the area per a single molecule can be determined. For a very surface-active surfactant, its film tends to spread over a wide region. Therefore, its surface pressure will be high.

This highly surface active fraction is especially preferred for use within the scope of the instant invention, since it has a unique capacity for maintaining the strength of the liquid membrane with large concentrations of solubilizing additive. Each saponin molecule consists of a sapogenin which constitutes the aglucon moiety of a molecule and a sugar. The sapogenin may be a stearoid or a triturpene and a sugar moiety may be glycose, galactose, pentose or a methyl pentose. Saponin has been hypothesized according to Hackh's Chemical Dictionary by Julius Grant, Third Edition, 1944 (McGraw-Hill Book Company, Inc.) as having a formula $C_{32}H_{54}O_{18}$ and a molecular weight of 726.5

The general group of cationic surfactants includes amine salts as well as quaternary ammonium compounds. Salts of long-chain primary alkyl amines including octadecylamine and dodecylamine are effective surfactants.

Typical surfactants that may be combined or complexed with the solubilizing additives of this invention include the IGEPAL series. These are nonionic surfactants; nonylphenoxypolyethyleneoxy ethanols. IGEPAL is a trademark of the General Aniline and Film Corporation and the surfactant series has the general configuration $RC_6H_4O(CH_2CH_2O)_n$ $CH_2CH_2OH$ where R may be $C_8H_{17}$, $C_9H_{19}$ or $C_{10}H_{21}$ and n varies from 1.5 to 100. Other surfactants include polyvinyl alcohol, a surface-active macromolecule; trimethyldodecyl ammonium chloride, an effective cationic quaternary ammonium surfactant; and sodium dodecyl sulfate.

In accordance with the invention, an aqueous solution of any one or a mixture of the above surfactants and the solubilizing additives is formed containing about 0.001 to 10 percent by weight and preferably about 0.2 percent by weight of the surfactant and 0.1 to 90 percent of the solubilizing additives. A mixture of hydrocarbons to be separated is then formed into drops and the drops are coated with a layer of the surfactant solution.

A number of methods may be used for forming the coated drops, for example by bubbling the hydrocarbon mixture through the surfactant solution. Alternatively, and as more fully described in U.S. Pat. No. 3,410,794, the hydrocarbon mixture is emulsified by mixing it in an aqueous solution for about one to 5 minutes at speeds of 300 rpm or higher and the emulsified mixture is then passed through the solvent.

By emulsifying the hydrocarbon mixture, relatively small drops having a diameter of from about $1 \times 10^{-6}$ to $1 \times 10^{-2}$ cm are obtained that are coated on the outer surfaces with a liquid membrane of the surfactant solution. Emulsification can be accomplished in any of several ways, such as high speed stirrers, colloid mills, valve homogenizers, ultrasonic generators, or mixing jets.

In accordance with the process of this invention, a solubilizing additive is included in the surfactant solution. Such additive must be chosen on the basis of its ability to selectively increase the solubility of the desired feed component(s) in the liquid surfactant membrane. Specific additives for use with various feed components of interest include the following:

| Solubilizing Additive | Feed Component |
|---|---|
| Cuprous ammonium acetate | $C_1$-$C_{10}$ Diolefins or olefins |
| Sulfuric Acid | $C_6$-$C_{20}$ Aromatics |
| Thiourea | $C_1$-$C_{10}$ Olefins |
| Acetonitrile | $C_1$-$C_{10}$ Diolefins |
| N-methylpyrrolidine | $C_1$-$C_{10}$ Diolefins |
| Strong base | $\alpha$- Acetylenes |
| Strong base | $C_1$-$C_{10}$ Mercaptans |
| Sulfuric Acid | $C_1$-$C_{10}$ Olefins |
| Weak Acids | $C_1$-$C_{10}$ Amines |

It should be noted that the solubilizing additive should be soluble in the liquid surfactant membrane and not substantially soluble in either the solvent or the feed since migration of the additive into either organic phase would defeat the purpose of this invention.

Additionally, the specific solubilizing additive should be chosen with respect to the surfactant or vice versa since it is imperative that the solubilizing additive and the surfactant do not interact to substantially weaken the liquid surfactant membrane strength. In general, the surfactant should not react with the additive to destroy the membrane, e.g., ester or ether type surfactants will be hydrolyzed with strong basic or acid additives. The surfactant or the additive should not interact to limit the solubility of the other in the membrane phase, e.g., the precipitation of low ethylene oxide adducts of nonyl phenol with salts. The solubilizing additive should not act to increase appreciably the solubility of the surfactant in either the feed or the solvent phases. The surfactant should be chosen so as not to destroy the selectivity gained by use of the additive.

In the liquid membrane process, the solubilizing additives of this invention are added to the surfactant solution in an amount of at least 0.2 percent. It is not desirable to add more than 90 wt. percent because the surfactant solution may become too viscous for efficient handling. Typically, 0.5 to 20 wt. percent of the solubilizing additive is added to the surfactant. The preferred range is 0.5 to 10 wt. percent.

The surfactant membrane coated drops of the hydrocarbon mixture, containing the additive of the instant invention are then passed into contact with a solvent. The solvent receives the more permeable element of the mixture which permeates through the liquid membrane. Consequently, the solvent becomes enriched in this more permeable element while the concentration of the less permeable element increases within the individual surfactant coated droplets.

Solvents which may be used in the liquid membrane process are generally organic in nature, and include the $C_5$ to $C_{12}$ paraffins, such as hexane, decane, undecane, dodecane, neopentane, etc. Aromatic solvents which may be utilized include paraxylene, benzene, toluene, chlorobenzene and other halogenated aromatics. Mixed solvents can also be used such as heating oil, kerosene, or solvent 100 neutral which is a heavy paraffin oil. When the liquid surfactant membrane is the hydrocarbon phase, the solvent will usually be water.

The solvent may be selected either because it is miscible with all members of the feed mixture or because it has a selective miscibility with the more permeable compounds. In general, the solvent has a boiling point very different from those of the permeable compounds in order to enhance subsequent separation of the permeates from the solvent. Typical difference between boiling points is 100° to 400°F.

Contact time with the solvent varies for different hydrocarbon mixtures. The maximum separation yield or the highest concentration of the more permeable component in the solvent phase in a batch process usually occurs at about 20–40 minutes contact, after which the yield begins to decline. In a continuous process, the separation yield is a constant and contact time in a multi-stage process may be 1–2 min/stage.

After the prescribed solvent-contact time, the solvent containing the more permeable hydrocarbon component or components is separated from the residual emulsion incorporating drops now containing a higher concentration of the less permeable component or components of the hydrocarbon mixture.

Following this separation, the solvent is distilled or otherwise treated to recover the permeate and the aqueous surfactant emulsion is broken to recover the non-permeate. The distilled permeate is condensed and taken out as product and the solvent is recycled for reuse in the separation process. Breaking of the non-permeate emulsion can be accomplished in a suitable de-emulsification unit where the hydrocarbons and the surfactants having different densities separate out into distinct layers. The top layer, usually the hydrocarbons, is taken out as product or recycled for further processing.

The bottom layer, usually the broken aqueous surfactant solution containing the solubilizing additive is recycled for re-use in the separation process.

Multistages can also be used to achieve additional enrichment of the separated components. In such a multistage process, after an initial separation of the permeate from the solvent phase the permeate is recycled back to the emulsion zone to be once again contacted with liquid surfactant and thereby forms a new emulsion. In like manner, after the emulsion is broken, the non-permeate is recycled back to another emulsion zone and treated again. Such multistage and recycle processes can be used to produce substantially pure components.

It is generally only necessary to prevent freezing or undesired boiling of the various elements used in the process and maintain them as liquids so that mass transfer can occur. Ambient temperatures and higher, therefore, i.e., −20° to +70°C., can be used in the process of this invention.

Pressure is not critical and need only be sufficient to maintain all the ingredients, i.e., the surfactant, solvent, and hydrocarbon mixtures, in the liquid phase. Ambient pressures, therefore, i.e., one atmosphere, can be used in the process of this invention.

The following specific embodiments of the instant invention are not meant to limit its scope.

EXAMPLE 1

Use of Saponin and Cuprous Ammonium Acetate in Liquid Surfactant Membrane Separation Process 50 percent by weight of a 50 wt. % aqueous cuprous ammonium acetate was added to a 0.2 percent by weight solution of a commercial grade of Saponin in water. This solution was used to emulsify a feed consisting of equal parts by weight of n-heptane and 1-hexene, 140 gms. aqueous phase to 140 gms. hydrocarbon phase. This system proved to be unstable in the presence of the n-octane solvent and substantially no separation was obtained. A solution of Saponin extract was obtained by bubbling air through 285 cubic centimeters meters of a 0.2 percent solution of commercial grade Saponin. The foam thus formed was allowed to flow into a receiver and collected. When the total of 140 grams of Saponin extract was obtained, the operation was stopped. This Saponin extract was substituted for the commercial grade Saponin solution previously used. This Saponin extract solution contained approximately 0.2 percent of the Saponin extract. The separation factor (the ratio of concentration of hexene to that of heptane in the solvent phase divided by the same ratio of concentrations in the raffinate phase) obtained was 14.6 . When 15 percent cuprous ammonium acetate was substituted for the 50 percent previously used the said maximum separation factor was 7.6 . When a mixture of butadiene and $C_4$ and $C_5$ alkanes and olefins is substituted for the hexane-heptane mixture substantially similar results are obtained, in that the butadiene is preferentially separated from the other components of the mixture.

EXAMPLE 2

Variation of Separation Achieved with Time

Run Temperature: 25°C.
Composition of a Single Feed Drop: 48.5% hexene + 51.5% heptane
Surfactant Solution: 50% Saponin extract solution* + 50% cuprous ammonium acetate solution of a 50 wt. percent aqueous
Solvent: n-octane

| Sampling Time (min.) | Permeate Concentration in solvent Wt.% 1-hexene | Wt.% n-heptane |
|---|---|---|
| 0 to 9 | 0 | 0 |
| 116 | 92.6 | 7.4 |
| 151 | 93.0 | 7.0 |
| 168 | 93.6 | 6.4 |
| 183 | 93.0 | 7.0 |

*Obtained by bubbling air through a 0.2% Saponin (practical grade) solution for 20 minutes.

| Sampling Time (Min.) | Permeate Concentration in Solvent Wt.% 1-hexene | Wt.% n-heptane |
|---|---|---|
| 200 | 93.4 | 6.6 |
| 213 | 93.6 | 6.4 |
| 239 | 93.4 | 6.6 |
| 285 | 92.5 | 7.5 |
| 336 | 92.8 | 7.8 |
| 380 | 91.2 | 8.8 |
| 396 | 91.7 | 8.3 |
| 414 | 91.0 | 9.0 |
| 417 | 56.2 | 43.8 |
| 423 | 48.2 | 51.8 |

EXAMPLE

Separation with an Immiscible Non-Aqueous Liquid Membrane

These examples demonstrate that inorganic species can be separated from aqueous feedstreams by use of the process of this invention. In the following runs the separation of phosphate ions by a liquid membrane process is optimized by the use of a polyamine additive incorporated in the hydrocarbon liquid membrane. In some of these particular examples, phosphate ions in the solvent phase, after permeation into the interior phase, are precipitated by calcium ions present therein, to reduce permeation back through the hydrocarbon liquid membrane into the solvent phase.

| Run No. | 1 | 2 | 3 | 4 |
|---|---|---|---|---|
| Aqueous Feed (solvent phase) gms. | 107 | 107 | 500 | 500 |
| Phosphate (wt. % in solvent phase) | 0.565 | 0.565 | 0.273 | 0.273 |
| Emulsion (hydrocarbon liquid membrane and interior phase) gms. | 97 | 97 | 281 | 281 |
| Hydrocarbon Liquid Membrane Wt. % in Emulsion | 66.9 | 66.9 | 67 | 67 |

| Run number | 1 | 2 | 3 | 4 |
|---|---|---|---|---|
| Components of hydrocarbon liquid membrane (wt. percent). | 49% JMT Primene [a]<br>49% ENJ3029 [b]<br>2% Span 80 [c] | → <br> → <br> → | 95% SIOON [d]<br>2% Amberlite LA-2 [e]<br>2% ENJ3029 | → <br> → <br> → |
| Interior Phase: Weight percent in emulsion | 33.1 | 33.1 | 33 | 33. |
| Components of interior phase (weight percent). | 6% CaCl₂<br>6% NH₄OH (0.1 N)<br>Remainder water | Water | 15% CaCl₂<br>5% Ca(OH)₂<br>Remainder water. | → <br> → |
| Run data time (min.): | Weight percent phosphate in aqueous feed (solvent phase) | | | |
| 2 | 0.265 | 0.338 | 0.123 | 0.133. |
| 5 | 0.200 | 0.314 | 0.073 | 0.120. |
| 18 | 0.050 | 0.316 | 0.016 | 0.075. |
| 44 | | 0.294 | 0.004 | 0.018. |

[a] High molecular weight amine, 100% active.
[b] High molecular weight amine, 70% active, dissolved in SIOON.
[c] Sorbitan monooleate, viscosity of 1,000 cs. at 25° C.
[d] High molecular weight isoparaffin.
[e] High molecular weight amine.

In all of the experiments described in Examples 1 through 3, the omission of the solubilizing additive has the effect of reducing the rate of permeation of the desired components through the liquid membrane.

More specifically, in the experiment described in Example 1, wherein a Saponin extract liquid membrane was utilized (without cuprous ammonium acetate) to separate 1-hexene from n-heptane, a maximum separation factor of 2.9 was obtained, under the same process conditions.

In the experiment described in Example 3, wherein a 2 percent Span 80 in S100N was utilized as the liquid surfactant membrane (without the high molecular weight amine additive), no decrease in phosphate ion concentration in the feedstream was observed with time.

Thus, it is clearly demonstrated that the incorporation of a solubilizing additive in the liquid membrane results in an improved liquid membrane separation process.

What is claimed is:

1. A process for separating olefins from admixture with other hydrocarbons which comprises:
   a. forming droplets of said mixture;
   b. coating said droplets with an aqueous solution, which comprises a surfactant and a solubilizing additive selected from the group consisting of cuprous ammonium acetate, thiourea, sulfuric acid, $C_1$ to $C_{10}$ nitriles, $C_1$ to $C_{10}$ sulfones, and $C_1$ to $C_{10}$ amides, said aqueous solution forming liquid surfactant membranes around said droplets which allows selective permeation of said olefin, and c. contacting said liquid surfactant membrane coated droplets with a solvent selective for said olefin, whereby at least a portion of said olefin passes through said membrane into said solvent and at least a portion of said other hydrocarbons remains within said droplet.

2. The process of claim 1 wherein said other hydrocarbons are alkanes.

3. The process of claim 2 wherein said admixture is emulsified in the aqueous solution to from the coated droplets.

4. The process of claim 3 wherein said solubilizing additive is selected from the group consisting of sulfuric acid, and cuprous ammonium acetate.

5. The process of claim 4 wherein said solubilizing additive is cuprous ammonium acetate.

6. The process of claim 5 wherein said surfactant comprises a saponin extract.

7. The process of claim 1 wherein the solubilizing additive comprises from 0.1 to 90 percent and the surfactant comprises at least 0.2 percent by weight of the liquid surfactant membrane.

8. A process for separating diolefins from admixture with other hydrocarbons which comprises:
 a. forming droplets of said mixture;
 b. coating said droplets with an aqueous solution which comprises a surfactant and a solubilizing additive selected from the group consisting of dimethylacetamide, dimethylformamide, cuprous ammonium acetate, acetonitrile and N-methylpyrrolidone, said aqueous solution forming liquid surfactant membranes around said droplets which allows selective permeation of said diolefin and,
 c. contacting said liquid surfactant membrane coated droplets with a solvent selective for said diolefin, whereby at least a portion of said diolefin passes through said membrane into said solvent and at least a portion of said other hydrocarbons remains within said droplet.

9. The process of claim 8 wherein said admixture is emulsified in the aqueous solution to form the coated droplets.

10. The process of claim 9 wherein the solubilizing additive comprises from 0.1 to 90 percent and the surfactant comprises at least 0.2 percent by weight of the liquid surfactant membrane.

11. The process of claim 10 wherein said diolefin comprises butadiene and said other hydrocarbons comprise butenes and butanes.

12. The process of claim 10 wherein said diolefin is isoprene, said other hydrocarbons comprise lower unsaturated $C_5$ hydrocarbons and said solubilizing additive comprises compounds selected from the group consisting of dimethylacetamide, dimethylformamide, acetonitrile, and N-methyl pyrollidone.

13. A process for separating aromatics from admixture with other hydrocarbons which comprises:
 a. forming droplets of said mixture;
 b. coating said droplets with an aqueous solution, which comprises a surfactant and a solubilizing additive selected from the group consisting of sulfolane and sulfuric acid, said aqueous solution forming liquid surfactant membranes around said droplets which allows selective permeation of said aromatic, and
 c. contacting said liquid surfactant membrane coated droplets with a solvent selective for said aromatic, whereby at least a portion of said aromatic passes through said membrane into said solvent and at least a portion of said other hydrocarbons remains within said droplet.

14. The process of claim 13 wherein said admixture is emulsified in the aqueous solution to form the coated droplets.

15. The process of claim 14 wherein the solubilizing additive comprises from 0.1 to 90 percent and the surfactant comprises at least 0.2 percent by weight of the liquid surfactant membrane.

16. The process of claim 15 wherein said other hydrocarbons comprise paraffins and olefins and said solubilizing additive is sulfolane.

17. The process of claim 15 wherein said aromatic is a $C_6$ to $C_{20}$ aromatic and said solubilizing additive is sulfuric acid.

18. A process for separating α-acetylenes from admixture with other hydrocarbons which comprises:
 a. forming droplets of said mixture;
 b. coating said droplets with an aqueous solution, which comprises a surfactant and a solubilizing additive selected from the group consisting of sodium and potassium hydroxide, said aqueous solution forming liquid surfactant membranes around said droplets which allows selective permeation of said α-acetylenes, and
 c. contacting said liquid surfactant membrane coated droplets with a solvent selective for said α-acetylenes, whereby at least a portion of said α-acetylenes passes through said membrane into said solvent and at least a portion of said other hydrocarbons remains within said droplet.

19. The process of claim 18 wherein said admixture is emulsified in the aqueous solution to form the coated droplets.

20. The process of claim 19 wherein the solubilizing additive comprises from 0.1 to 90 percent and the surfactant comprises at least 0.2 percent by weight of the liquid surfactant membrane.

* * * * *